(12) United States Patent
Chopra et al.

(10) Patent No.: US 7,758,403 B2
(45) Date of Patent: Jul. 20, 2010

(54) SYSTEM, METHOD AND APPARATUS FOR LAPPING WORKPIECES WITH SOLUBLE ABRASIVES

(75) Inventors: Manoj Chopra, Union City, CA (US); Glenn Paul Gee, San Jose, CA (US); Xavier Charles Lelong, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 38 days.

(21) Appl. No.: 11/941,282

(22) Filed: Nov. 16, 2007

(65) Prior Publication Data
US 2009/0130957 A1   May 21, 2009

(51) Int. Cl.
*B24B 1/00* (2006.01)
(52) U.S. Cl. ..................... 451/36; 451/103
(58) Field of Classification Search .................. 451/28, 451/41, 103, 104, 36, 37, 59
See application file for complete search history.

(56) References Cited

U.S. PATENT DOCUMENTS

| | | | |
|---|---|---|---|
| 5,316,587 A | 5/1994 | Yam et al. | |
| 5,645,471 A * | 7/1997 | Strecker | 451/59 |
| 6,037,316 A | 3/2000 | Garner et al. | |
| 6,270,393 B1 * | 8/2001 | Kubota et al. | 451/36 |
| 6,645,624 B2 | 11/2003 | Adefris et al. | |
| 6,656,022 B2 * | 12/2003 | Ota et al. | 451/41 |
| 6,764,950 B2 | 7/2004 | Noguchi et al. | |
| 6,858,292 B2 | 2/2005 | Kendall | |
| 6,884,663 B2 | 4/2005 | Dlugokecki et al. | |
| 6,969,412 B2 | 11/2005 | Welygan et al. | |
| 7,160,173 B2 | 1/2007 | Palmgren | |
| 7,183,213 B2 | 2/2007 | Shiho et al. | |
| 2006/0211247 A1 | 9/2006 | Dunham et al. | |

FOREIGN PATENT DOCUMENTS

JP                09194825           7/1997

OTHER PUBLICATIONS

Shi, Frank G., et al., A New Theory for CMP with Soft Pads, IEEE, 1998, pp. IITC 98-73-75.
Globalspec.com, Abrasives and Abrasive Products, 1999.
Gu, et al., A Plasticity-Based Model of Material Removal in Chemical-Mechanical Polishing (CMP), IEEE, Transactions on Semiconductor Manufacturing, vol. 14, No. 4, Nov. 2001, pp. 406-417.
Chen, Jerry M., et al., Hydrodynamic Characteristics of the Thin Fluid Film in Chemical-Mechanical Polishing, IEEE, Transactions on Semiconductor Manufacturing, vol. 15, No. 1, Feb. 2002, pp. 39-44.
Lee, et al., Development of a CMP Pad with Controlled Micro Features for Improved Performance, IEEE, 2005, pp. 173-176.
Saint-Gobain, Grains & Powders, MEMS/Nano-Tech, 2005.
Kement Liquid Diamond/Diamond Slurry.

* cited by examiner

*Primary Examiner*—Robert Rose

(57) ABSTRACT

A soluble abrasive is used to lap workpieces to overcome the problem of embedding and retaining abrasive particles in the workpieces. The soluble abrasives are dissolved from the workpiece even if they become embedded in the workpiece. For example, the abrasives may be dissolved with water and comprise ionic salts. The soluble abrasive has a hardness that is equal to or slightly greater than the hardness of the metal being lapped.

25 Claims, 2 Drawing Sheets

SYSTEM, METHOD AND APPARATUS FOR LAPPING WORKPIECES WITH SOLUBLE ABRASIVES

BACKGROUND OF THE INVENTION

1. Technical Field

The present invention relates in general to processing sliders for hard disk drives and, in particular, to an improved system, method and apparatus for lapping hard disk drive sliders with soluble abrasives.

2. Description of the Related Art

Data access and storage systems generally comprise one or more storage devices that store data on magnetic or optical storage media. For example, the magnetic storage device or hard disk drive (HDD) includes one or more disks and a disk controller to manage local operations concerning the disks. The disks are stacked vertically on a common spindle that is turned by a disk drive motor at several thousand revolutions per minute (rpm).

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The read/write head comprises an electromagnetic coil writer, a reader, and a slider body. It flies over the magnetic disk to perform the read and write functions. To achieve optimum performance, the spacing between the transducer and the disk, called the magnetic space must be consistently maintained. The magnetic space has become consistently smaller over time with the increasing of recording areal density. The magnetic space is defined as the fly height plus the pole tip recession (PTR).

The PTR has been a major contributor to the magnetic space loss for high areal density products. The PTR is the height difference between the pole tips and a plane fitted to the ABS. It is caused by the differences in the removal rates of metal poles, alumina, and AlTiC in the slider abrasive finishing process. The slider abrasive finishing process critically affects the magnetic, electrical, and mechanical performances, as well as the stability of the recording heads. Therefore, ultraprecision abrasive finishing is a key technology in the final finishing of thin film magnetic recording heads.

Lapping is a material removal process for the production of flat surfaces by free-abrasive three-body abrasion. A loose abrasive and a hard lapping plate are used for this purpose. During lapping, besides three-body abrasive abrasion (i.e., rolling), some abrasives also temporarily embed in the lapping plate to cause some temporal two-body abrasion. High material removal rate can be achieved by free-abrasive lapping.

Nanogrinding is a fixed abrasive two-body abrasion process that uses fixed-abrasive embedded in a soft supporting body as a finishing process for producing flat and good surface finish. The material removal rate from fixed-abrasive nanogrinding is lower than from free-abrasive lapping, but it can produce superior surface planarity (e.g., less recession). The recording heads/sliders are finished by free-abrasive lapping followed by fixed-abrasive nanogrinding. High material removal is achieved by free-abrasive lapping, and good surface finish and planarity are obtained by fixed-abrasive nanogrinding. Appropriate chemical-mechanical interactions in fixed-abrasive nanogrinding (i.e., chemical-mechanical nanogrinding) result in further improvements in achieving good surface finish and planarization.

The planarity and surface finish from fixed-abrasive nanogrinding are superior to those from free-abrasive lapping. For example, with a rough lapping plate, the PTR can be improved to about 8 nm by fixed-abrasive nanogrinding process versus about 32 nm by free-abrasive process. With a fine lapping plate with a fixed-abrasive nanogrinding process, PTR can be improved to a mean of about 1.0 nm. In addition, fixed-abrasive nanogrinding is virtually scratch-free in contrast to the significant scratching of free-abrasive lapping.

Further planarity and surface finish improvements are achieved by adjusting mechanical and chemical interaction in fixed-abrasive nanogrinding and chemical-mechanical nanogrinding. Process integration and throughput issues are considered for free-abrasive and fixed-abrasive processes. Free-abrasive lapping process is recommended for high material removal rates (MRR), followed by the fixed-abrasive nanogrinding process for achieving excellent finish.

In the field of lapping and chemical-mechanical polishing (CMP), one major issue related to lapping soft metals such as gold, tin, antimony, etc., is the unintentional impregnation of the hard, insoluble abrasive particles into the soft and ductile metal. This contamination can affect the electrical or mechanical properties of the metal since the embedded abrasives can form electrical interconnections. One way to lap or CMP such metals is to use special CMP pads with water. However this occurs at much lower lap rates where the major mechanism of material removal is dominated more by polishing and etching rather than actual bulk material removal. Although these processes are workable, an improved solution that overcomes the limitations and problems associated with the prior art would be desirable.

SUMMARY OF THE INVENTION

Embodiments of a system, method and apparatus for lapping hard disk drive sliders with soluble abrasives are disclosed. To overcome the problem of embedding and retaining abrasive particles in the sliders, soluble abrasives that can be dissolved from the workpiece even if they become embedded in the workpiece. In one embodiment, the abrasives are soluble in water and comprise ionic salts (e.g., sodium bicarbonate, calcium sulfate, calcium carbonate, etc.). The soluble abrasive is selected such that its hardness is equal to or slightly greater than (e.g., 0 to 20% greater than) the hardness of the metal being lapped.

The soluble abrasives may be provided in a resin binder that may comprise an organic material that is much softer than the metals being lapped. This solution permits a higher lapping rate than prior art designs. Moreover, any subsequent contamination that may be impregnated into the soft metal is easily removed by washing profusely with deionized water. The water simply dissolves and completely eliminates the embedded ionic salt.

In one embodiment, the soluble abrasives are formed or integrated with an abrasive tape. During the lapping process a lubricant, such as glycol, is used in conjunction with the abrasive tape to lap the workpieces. However, the abrasive material is not soluble in the lubricant such that it does not degrade during the lapping process. Only after the lapping process is complete are the embedded abrasives dissolved from the workpiece.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
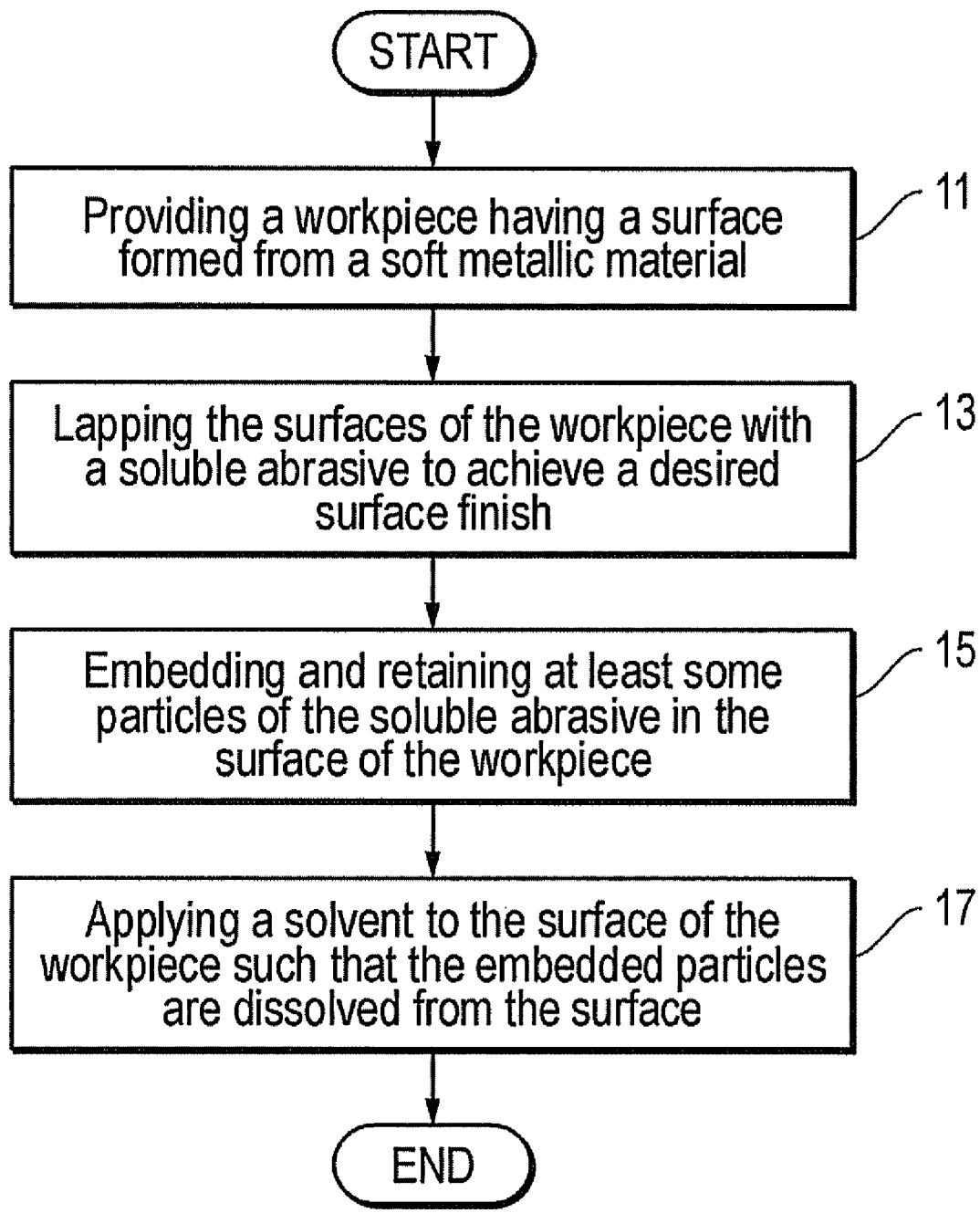
FIG. 1 is a high level flow diagram of one embodiment of a method constructed in accordance with the invention.
Figure 2:
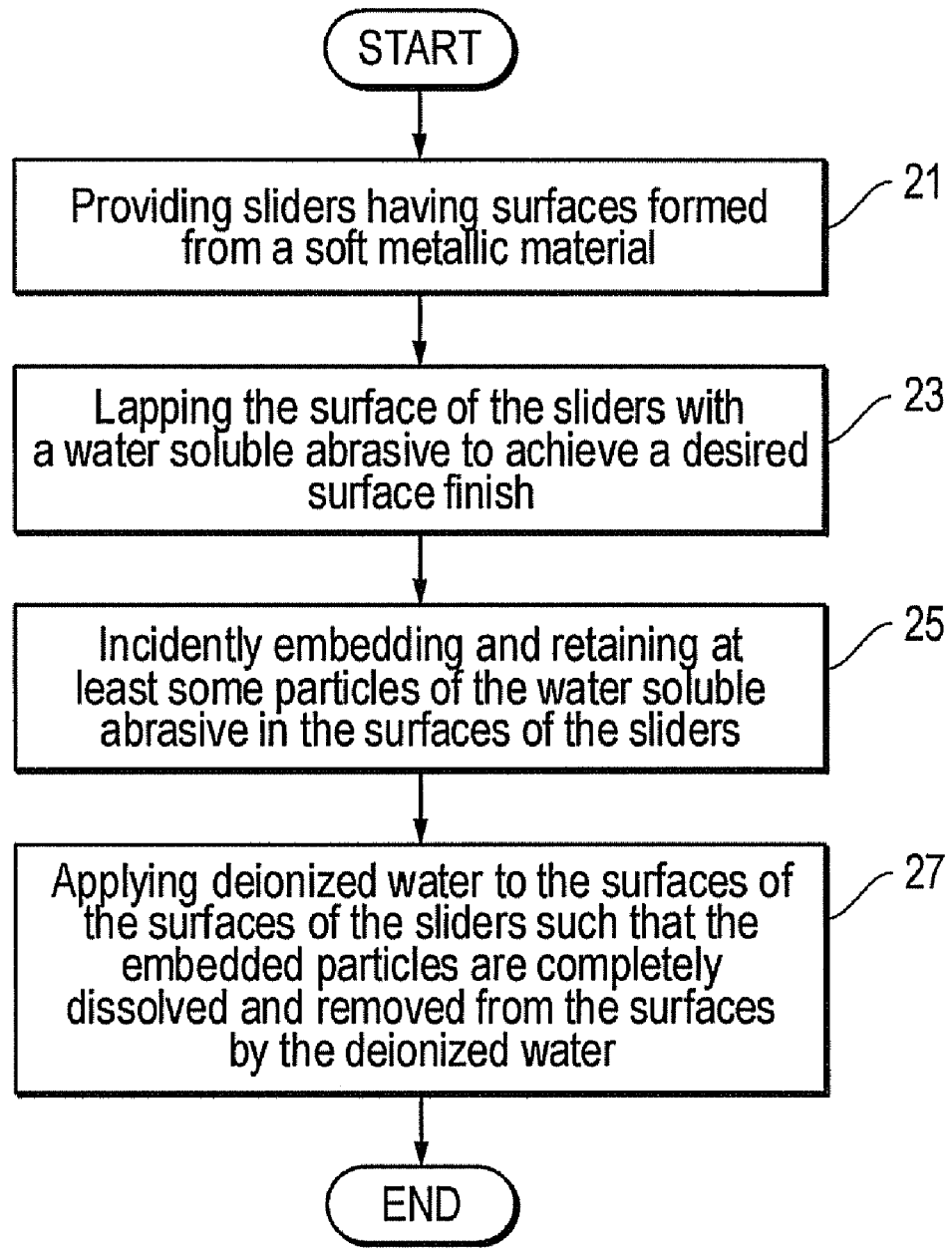
FIG. 2 is a high level flow diagram of another embodiment of a method constructed in accordance with the invention.

Referring to FIGS. 1 and 2, embodiments of a system and method for lapping workpieces are disclosed. The workpieces may comprise many different objects, but the invention is well suited for lapping hard disk drive sliders that are formed from a variety of different materials, such as soft metallic materials.

In one embodiment (FIG. 1), the method comprises providing a workpiece having a surface formed from a soft metallic material (step 11); lapping the surface of the workpiece with a soluble abrasive to achieve a desired surface finish (step 13); incidentally or unintentionally embedding and retaining at least some particles of the soluble abrasive in the surface of the workpiece (step 15); applying a solvent to the surface of the workpiece such that the embedded particles are dissolved from the surface (step 17); before ending as indicated.

Step 13 may comprise lapping the workpiece with a water soluble abrasive, and step 17 may comprise dissolving the embedded particles with water (e.g., deionized water). The soluble abrasive may comprise an ionic salt such as sodium bicarbonate, calcium sulfate, or calcium carbonate. The surface of the workpiece may be profusely washed with deionized water to dissolve and completely eliminate the embedded particles from the workpiece.

In one embodiment, the soluble abrasive has a hardness that is equal to or greater than a hardness of the soft metallic material. For example, the hardness of the soluble abrasive may be up to 20% greater than the hardness of the soft metallic material. The soluble abrasive may be provided in a resin binder, such as an organic material having a hardness that is significantly lower than a hardness of the soft metallic material.

In one embodiment, the soluble abrasive is provided in an abrasive tape, such as TRIZAC® by 3M Company. A lubricant, such as glycol, may be used between the surface of the workpiece and the tape to lap the workpiece. The embedded particles do not dissolve during the lapping process. Rather, the embedded abrasive is only dissolved and removed after the lapping is complete.

In another embodiment (FIG. 2), the invention comprises a method of lapping sliders for hard disk drives, including providing sliders having surfaces formed from a soft metallic material (step 21); lapping the surfaces of the sliders with a water soluble abrasive to achieve a desired surface finish (step 23); incidentally embedding and retaining at least some particles of the water soluble abrasive in the surfaces of the sliders (step 25); applying deionized water to the surfaces of the sliders such that the embedded particles are completely dissolved and removed from the surfaces by the deionized water (step 27); before ending as indicated.

As described herein, the water soluble abrasive may comprise calcium carbonate, or an ionic salt selected from the group consisting of sodium bicarbonate, calcium sulfate, and calcium carbonate. The water soluble abrasive may be provided with a hardness that is equal to or greater than a hardness of the soft metallic material by up to 20%. In addition, the water soluble abrasive may be provided in a resin binder comprising an organic material having a hardness that is significantly lower than a hardness of the soft metallic material. In other embodiments, the water soluble abrasive may be provided in an abrasive tape comprising TRIZAC®, and glycol is used as a lubricant between the surface and the tape to lap the sliders.

While the invention has been shown or described in only some of its forms, it should be apparent to those skilled in the art that it is not so limited, but is susceptible to various changes without departing from the scope of the invention.

What is claimed is:

1. A method of lapping workpieces, comprising:
   (a) providing a workpiece having a surface formed from a soft metallic material;
   (b) lapping the surface of the workpiece with a soluble abrasive provided in a resin binder to achieve a desired surface finish, the soluble abrasive having a hardness up to 20% greater than the hardness of the soft metallic material;
   (c) embedding and retaining at least some particles of the soluble abrasive in the surface of the workpiece, such that the embedded particles do not dissolve during steps (b) or (c); and
   (d) applying a solvent to the surface of the workpiece such that the embedded particles are dissolved from the surface.

2. A method according to claim 1, wherein step (b) comprises lapping with water soluble abrasive, and step (d) comprises dissolving the embedded particles with water.

3. A method according to claim 1, wherein step (b) comprises lapping with an ionic salt.

4. A method according to claim 1, wherein step (b) comprises lapping with a material selected from the group consisting of sodium bicarbonate, calcium sulfate, and calcium carbonate.

5. A method according to claim 1, wherein the resin binder comprises an organic material having a hardness that is significantly lower than a hardness of the soft metallic material.

6. A method according to claim 1, wherein step (d) comprises profusely washing the surface with deionized water to dissolve and completely eliminate the embedded particles.

7. A method according to claim 1, wherein the soluble abrasive is provided in an abrasive tape.

8. A method of lapping sliders for hard disk drives, comprising:
   (a) providing sliders having surfaces formed from a soft metallic material;
   (b) lapping the surfaces of the sliders with a water soluble abrasive to achieve a desired surface finish, the water soluble abrasive having a hardness that is equal to or greater than a hardness of the soft metallic material by up to 20%, the water soluble abrasive being provided in a resin binder;
   (c) incidentally embedding and retaining at least some particles of the water soluble abrasive in the surfaces of the sliders; and
   (d) applying deionized water to the surfaces of the sliders such that the embedded particles are completely dissolved and removed from the surfaces by the deionized water, and wherein the embedded particles do not dissolve during steps (b) or (c).

9. A method according to claim 8, wherein the water soluble abrasive comprises calcium carbonate.

10. A method according to claim 8, wherein step (b) comprises lapping with an ionic salt selected from the group consisting of sodium bicarbonate, calcium sulfate, and calcium carbonate.

11. A method according to claim 8, wherein the resin binder comprises an organic material having a hardness that is significantly lower than a hardness of the soft metallic material.

12. A method of lapping workpieces, comprising:
   (a) providing a workpiece having a surface formed from a soft metallic material;
   (b) lapping the surface of the workpiece with a soluble abrasive in an abrasive tape and a lubricant comprising glycol to achieve a desired surface finish, the abrasive tape comprising TRIZAC;
   (c) embedding and retaining at least some particles of the soluble abrasive in the surface of the workpiece; and
   (d) applying a solvent to the surface of the workpiece such that the embedded particles are dissolved from the surface.

13. A method according to claim 12, wherein step (b) comprises lapping with water soluble abrasive, and step (d) comprises dissolving the embedded particles with water.

14. A method according to claim 12, wherein step (b) comprises lapping with an ionic salt.

15. A method according to claim 12, wherein step (b) comprises lapping with a material selected from the group consisting of sodium bicarbonate, calcium sulfate, and calcium carbonate.

16. A method according to claim 12, wherein the soluble abrasive has a hardness that is equal to or greater than a hardness of the soft metallic material.

17. A method according to claim 12, wherein the hardness of the soluble abrasive is up to 20% greater than the hardness of the soft metallic material.

18. A method according to claim 12, wherein the soluble abrasive is provided in a resin binder comprising an organic material having a hardness that is significantly lower than a hardness of the soft metallic material.

19. A method according to claim 12, wherein step (d) comprises profusely washing the surface with deionized water to dissolve and completely eliminate the embedded particles.

20. A method according to claim 1, wherein the embedded particles do not dissolve during steps (b) or (c).

21. A method of lapping sliders for hard disk drives, comprising:
   (a) providing sliders having surfaces formed from a soft metallic material;
   (b) lapping the surfaces of the sliders with a water soluble abrasive in an abrasive tape comprising TRIZAC and a lubricant comprising glycol to achieve a desired surface finish;
   (c) incidentally embedding and retaining at least some particles of the water soluble abrasive in the surfaces of the sliders; and
   (d) applying deionized water to the surfaces of the sliders such that the embedded particles are completely dissolved and removed from the surfaces by the deionized water.

22. A method according to claim 21, wherein the water soluble abrasive comprises calcium carbonate.

23. A method according to claim 21, wherein step (b) comprises lapping with an ionic salt selected from the group consisting of sodium bicarbonate, calcium sulfate, and calcium carbonate.

24. A method according to claim 21, wherein the water soluble abrasive has a hardness that is equal to or greater than a hardness of the soft metallic material by up to 20%.

25. A method according to claim 21, wherein the water soluble abrasive is provided in a resin binder comprising an organic material having a hardness that is significantly lower than a hardness of the soft metallic material.

* * * * *